United States Patent [19]

Hara et al.

[11] Patent Number: 4,977,506

[45] Date of Patent: Dec. 11, 1990

[54] SUSPENSION CONTROL APPARATUS FOR AN AUTOMOTIVE VEHICLE

[75] Inventors: Mitsuhiko Hara; Shozo Takizawa; Tadao Tanaka; Yasutaka Taniguchi, all of Okazaki; Shunichi Wada; Shigeki Ohtagaki, both of Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 258,410

[22] Filed: Oct. 17, 1988

[30] Foreign Application Priority Data

Oct. 15, 1987 [JP] Japan ................................. 62-262555

[51] Int. Cl.$^5$ ............................................. B60G 17/00
[52] U.S. Cl. ................................ 364/424.05; 280/707; 307/10.1
[58] Field of Search ................... 364/424.05; 280/707, 280/840; 307/9.1, 10.1

[56] References Cited

U.S. PATENT DOCUMENTS 4,624,476 11/1986 Tanaka et al. ...................... 280/707
4,693,493 9/1987 Ikemoto et al. ..................... 280/707
4,792,703 12/1988 Koyama ............................... 307/9.1

FOREIGN PATENT DOCUMENTS 0142947 10/1984 European Pat. Off. .

OTHER PUBLICATIONS

"The Application of Active Suspension to High Performance Road Vehicles", by P. G. Wright, pp. 333–337.

Primary Examiner—Gary Chin
Attorney, Agent, or Firm—Sughrue, Mion, Zinn, Macpeak & Seas

[57] ABSTRACT

A suspension control apparatus for an automotive vehicle has a plurality of suspension units which are disposed between each of the wheels of the vehicle and the vehicle body. A plurality of actuators for controlling the characteristics of the suspension units are controlled by a control unit in response to the output of an acceleration sensor. The ground circuit of the acceleration sensor is connected to the ground circuit of the control unit.

2 Claims, 5 Drawing Sheets

SUSPENSION CONTROL APPARATUS FOR AN AUTOMOTIVE VEHICLE

BACKGROUND OF THE INVENTION

This invention relates to a suspension control apparatus for an automotive vehicle, and more particularly, it relates to a suspension control apparatus which can suppress rolling, nose-diving, and vertical motions of a vehicle so as to provide a more comfortable ride.

During the operation of an automotive vehicle, the vehicle is subjected to accelerations in various directions due to braking, turning, changes in speed, and irregularities in the road surface which cause the vehicle body to undergo rolling, pitching, and heaving motions. These motions impart an unpleasant sensation to the passengers of the vehicle. Accordingly, in recent years, there have been proposals for suspension systems which can suppress these motions and provide a more comfortable ride.

For example, Japanese Published Unexamined Utility Model Application No. 61-163710 and Japanese Published Unexamined Patent Application No. 62-34808 disclose suspension mechanisms in which a fluid spring chamber such as an air spring chamber is disposed between the wheels and the body of a vehicle. By controlling the supply of compressed air to the fluid spring chambers, rolling, nose-diving, vertical vibrations, and other motions of the vehicle body can be controlled. For example, during turning, the suspension units on the opposite side of the vehicle from the direction of turning normally attempt to contract, while the suspension units on the same side as the direction of turning attempt to expand, resulting in rolling motion. In order to suppress this motion, a set amount of compressed air is supplied to the fluid spring chambers of the suspension units which tend to contract, and a set amount of compressed air is discharged from the fluid spring chambers of the suspension units which tend to expand. As a result, the vehicle body is tilted back from the direction of tilting caused by the turn, and the vehicle body is maintained horizontal.

In the above-described conventional suspension control systems, in order to compute the magnitude of motions such as rolling, nose-diving, or vertical vibrations of the vehicle, it is necessary to measure the acceleration of the vehicle to the left and right, back and forth, or up and down, respectively. The intake or discharge of compressed air to the fluid spring chambers of the suspension units is controlled in accordance with the detected acceleration. Therefore, it is important that the value of the acceleration which is input from an acceleration sensor be accurate.

The output signal of the acceleration sensor (hereinbelow referred to as a G sensor), which is an analog value, is input to a control apparatus in which it is converted to a digital signal by an A/D converter. Based on the resulting digital signal, actuators such as step motors or high-speed solenoid valves which control the suspension units are operated. However, in the conventional suspension control systems, the G sensor is independently grounded with respect to the control apparatus, so the drive current for the above-mentioned actuators flows only into the ground of the control apparatus, and the ground potential of the control apparatus rises with respect to the ground potential of the G sensor. As a result, the voltage of the G sensor output signal as seen from the ground circuit of the A/D converter of the control apparatus appears smaller by the amount that the ground potential of the control apparatus has increased, the G sensor output signal is incorrectly judged as having changed, a signal to make the actuators operate is mistakenly output, and incorrect control is performed.

SUMMARY OF THE INVENTION

Accordingly, it is an object of the present invention to provide a suspension control apparatus which can prevent incorrect reading of the output signal of a G sensor and perform accurate suspension control regardless of the output current of a control apparatus.

In a suspension control apparatus in accordance with the present invention, a plurality of air suspension units which support a vehicle body are operated by actuators. The actuators are controlled by a control unit in accordance with the output of an acceleration sensor. The acceleration sensor is supported by the vehicle body and at the same time is electrically insulated therefrom. A ground circuit of the acceleration sensor is connected by a ground lead to a ground circuit of a control unit. As a result, when the ground potential of the ground circuit of the control unit varies due to the return currents of the actuators, the ground lead imparts the same voltage variation to the ground circuit of the acceleration sensor. Therefore, voltage differences between the two ground circuits are suppressed, errors in reading the output signal of the acceleration sensor are prevented, and accurate suspension control can be performed.

A suspension control apparatus for an automotive vehicle in accordance with the present invention comprises a plurality of suspension units which are disposed between each of the wheels of the vehicle and the vehicle body, a plurality of actuators for controlling the characteristics of the suspension units, acceleration detecting means for detecting the acceleration of the vehicle and producing a corresponding output signal, control means for calculating changes in the attitude of the vehicle based on at least the output signal of the acceleration detecting means, and controlling the actuators based on the calculated result so as to suppress changes in attitude of the vehicle body, and a ground wire which connects the ground circuit of the control means with the ground circuit of the acceleration detecting means.

The present invention can be used to suppress rolling, pitching, or heaving of a vehicle body by suitable positioning of the acceleration detecting means. In a preferred embodiment, the acceleration detecting means is disposed so as to detect lateral accelerations, and control is performed so as to suppress rolling.

The acceleration detecting means need not have any particular structure, but in a preferred embodiment, it is a differential transformer-type acceleration sensor.

BRIEF DESCRIPTION OF THE DRAWINGS

In the drawings, the same reference numerals indicate the same or corresponding parts.

DESCRIPTION OF THE PREFERRED EMBODIMENTS

Figure 1:
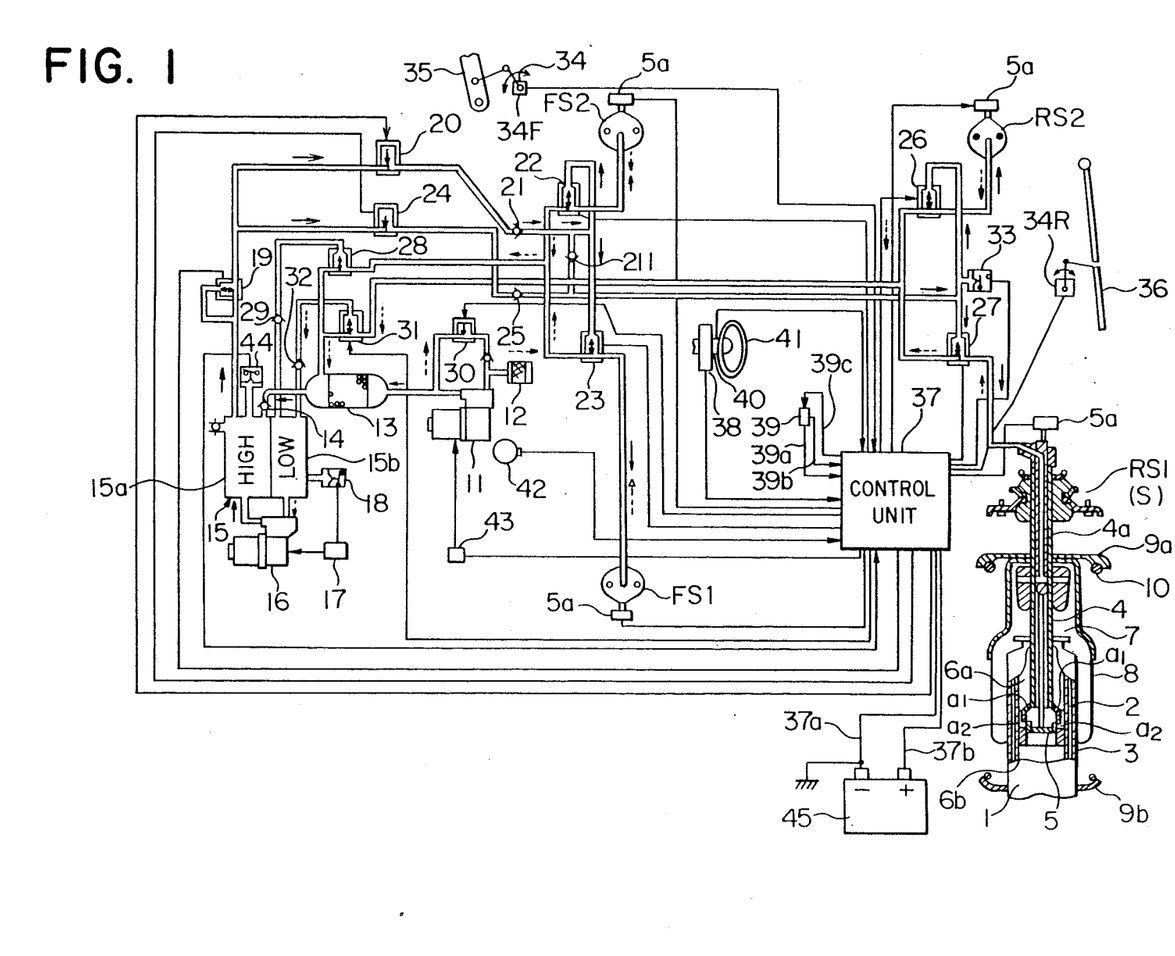
FIG. 1 is a schematic view of one embodiment of a suspension control apparatus in accordance with the present invention.

A preferred embodiment of a suspension control apparatus in accordance with the present invention will now be described while referring to the accompanying drawings, FIG. 1 of which is a schematic illustration of this embodiment. As shown in FIG. 1, the four unillustrated wheels of an automotive vehicle are equipped with four air suspension units FS1, FS2, RS1, and RS2, respectively. Units FS1 and RS1 are for the front and rear left wheels, and units FS2 and RS2 are for the front and rear right wheels, respectively. All four air suspension units have nearly the same structure, so except when the front and rear units are specifically distinguished, hereinbelow the air suspension units will be referred to simply by the letter S.

Each of the air suspension units S has a strut-type shock absorber 1 built into it. Each shock absorber 1 has a cylinder 2 which is mounted on one of the wheels and a piston 3 which can freely slide inside the cylinder 2. The cylinder 2 moves up and down with respect to a piston rod 4 in accordance with the up and down movement of the wheel, whereby it effectively absorbs shocks. Element number 5 is a damping force selector valve whose rotation is controlled by a step motor 5a. By rotating the damping force selector valve 5, it is possible to switch between a hard state in which a first damping chamber 6a and a second damping chamber 6b are connected by a single orifice a1, and a soft state in which the damping chambers 6a and 6b are connected by both orifice a1 and another orifice a2. The operation of the step motor 5a is controlled by a control unit 37 to be described further on.

A main air spring chamber 7 which also serves as a fluid chamber for adjusting the vehicle height is disposed at the top portion of the shock absorber 1 in a coaxial relationship with the piston rod 2. A portion of the main air spring chamber 7 is formed from a bellows 8. The piston rod 4 can be raised and lowered by supplying or discharging air to and from the main air spring chamber 7 through a passageway 4a which is formed in the piston rod 4.

An upwards-facing spring bearing 9b is secured to the outer wall of the lower end of the shock absorber 1, and a downwards-facing spring bearing 9a is formed on the outer wall of the main air spring chamber 7. A helical spring 10 is disposed between these spring bearings 9a and 9b.

A compressor 11 compresses atmospheric air which enters it through an air cleaner 12. The compressed air is then passed through a drier 13 which is filled with silica gel or other desiccant. After being dried, the compressed air passes through a check valve 14 and accumulates in a high-pressure chamber 15a of a reserve tank 15. The reserve tank 15 also has a low-pressure chamber 15b which is separated from the high-pressure chamber 15a. A compressor 16 which is controlled by a compressor relay 17 is connected between the high-pressure chamber 15a and the low-pressure chamber 15b of the reserve tank 15. The compressor relay 17 operates in response to a pressure switch 18 which adjoins the low-pressure chamber 15b of the reserve tank 15 and which turns on when the pressure in the low-pressure chamber 15b exceeds atmospheric pressure. When the pressure switch 18 turns on, compressor relay 17 closes and compressor 16 is driven. The compressor 16 draws air from the low-pressure chamber 15b, compresses it, and transfers the compressed air to the high-pressure chamber 15a. As a result, the pressure in the low-pressure chamber 15b is always maintained at below atmospheric pressure. The suspension units S are connected to the high-pressure chamber 15a of the reserve tank 15 by piping through which compressed air flows in the directions shown by the solid arrows in FIG. 1. Compressed air from high-pressure chamber 15a passes along the piping through an air supply flow control valve 19 in the form of a three-way valve to be described further on, a front wheel air supply solenoid valve 20, a check valve 21, a front right solenoid valve 22 or a front left solenoid valve 23, from which it is supplied to the front right suspension unit FS2 and/or the front left suspension unit FS1. In the same manner, after passing through the air supply flow control valve 19, compressed air from the high-pressure chamber 15a also passes through a rear wheel air supply solenoid valve 24, a check valve 25, a rear right solenoid valve 26, and a rear left solenoid valve 27, from which it is supplied to the rear right suspension unit RS2 and/or the rear left suspension unit RS1. The downstream side of check valve 21 and the downstream side of check valve 25 are connected by piping through another check valve 211.

On the other hand, the flow paths of discharge air from the suspension units S through piping which connects the suspension units S with the low-pressure chamber 15b are shown by the dashed arrows in FIG. 1. Namely, discharge air from front suspension units FS1 and FS2 passes through solenoid valves 22 and 23 and a front air discharge valve 28. From the front air discharge valve 28, the discharge air can either pass through a residual pressure valve 29 and enter the low-pressure chamber 15b, or it can pass through the drier 13, an air discharge solenoid valve 30, and the air filter 12 to be discharged into the atmosphere. In addition, discharge air from rear suspension units RS1 and RS2 passes through solenoid valves 26 and 27 and a rear air discharge valve 31. From the rear air discharge valve 31, the discharge air can either pass through a residual pressure valve 32 into the low-pressure chamber 15b, or it can pass through the drier 13, the air discharge solenoid valve 30, and the air filter 12 from which it is discharged into the atmosphere. When the pressure in the low-pressure chamber 15b is lower than the pressure in the main air spring chambers 7, the residual pressure valves 29 and 32 open, and when the pressure in the low-pressure chamber 15b is higher than the pressure in the main air spring chambers 7, the residual pressure valves 29 and 32 close. A pressure switch 33 is disposed in a connecting passageway which communicates between solenoid valves 26 and 27. The pressure switch produces an output signal which is input to the control unit 37.

A vehicle height sensing mechanism 34 comprises a front vehicle height sensor 34F which is mounted on the lower control arm 35 on the front right side of the suspension of the vehicle and which detects the height of the front of the vehicle, and a rear vehicle height sensor 34R which is mounted on the lateral rod 36 of the rear left side of the suspension and which senses the height of the rear of the vehicle. Each of the sensors 34F and 34R of the vehicle height sensor 34 detects the distance from a normal vehicle height and a low vehicle height or a high vehicle height and produces a corresponding output signal, which is input to the control unit 37.

A vehicle speed sensor 38 is housed inside a speedometer. This sensor 38 detects the vehicle speed and produces a corresponding output signal which is supplied to the control unit 37.

Figure 2:
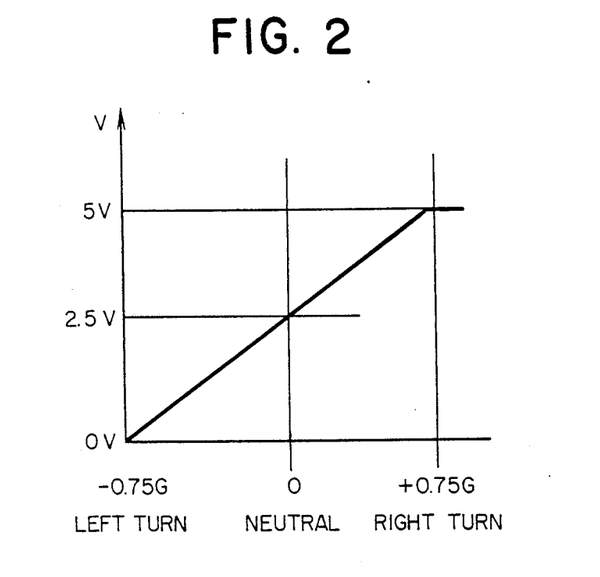
FIG. 2 is a graph of the output voltage of the G sensor of the embodiment of FIG. 1 as a function of acceleration.

A vehicle attitude sensor which detects changes in the attitude of the vehicle is provided in the form of a G sensor 39, i.e., an acceleration sensor. The G sensor 39 need not be of any particular type, but in the present embodiment, it is a differential transformer-type G sensor. It is disposed so as to detect lateral accelerations of the vehicle. FIG. 2 illustrates an example of the output characteristics of the G sensor 39. When the vehicle is travelling straight ahead and there are no lateral accelerations, it produces an output voltage of +2.5 V, which is used as a neutral point. When a right turn is performed, the output voltage increases linearly with the acceleration, and when a left turn is performed, the output voltage decreases linearly. The derivative with respect to time of the output voltage V is proportional to the angular speed of the steering wheel.

If it desired to detect longitudinal accelerations or vertical accelerations of the vehicle instead of lateral ones, it is necessary only to change the direction of installation of the G sensor 39, or to provide an additional, similar G sensor with the appropriate orientation. The G sensor 39 has a ground wire 39a which is connected to a ground circuit within the control unit 37. An output lead 39b of the G sensor 39 is connected to an input circuit of the control unit 37. A power supply lead 39c of the G sensor 39 is connected to the power supply circuit of the control unit 37. The drive currents for the step motors 5a and the like do not flow through the ground wire 39a but instead flow through the power supply ground 37a of the control unit 37. The control unit 37 is connected to a battery 45 by the ground wire 37a and a power supply lead 37b.

Figure 7:
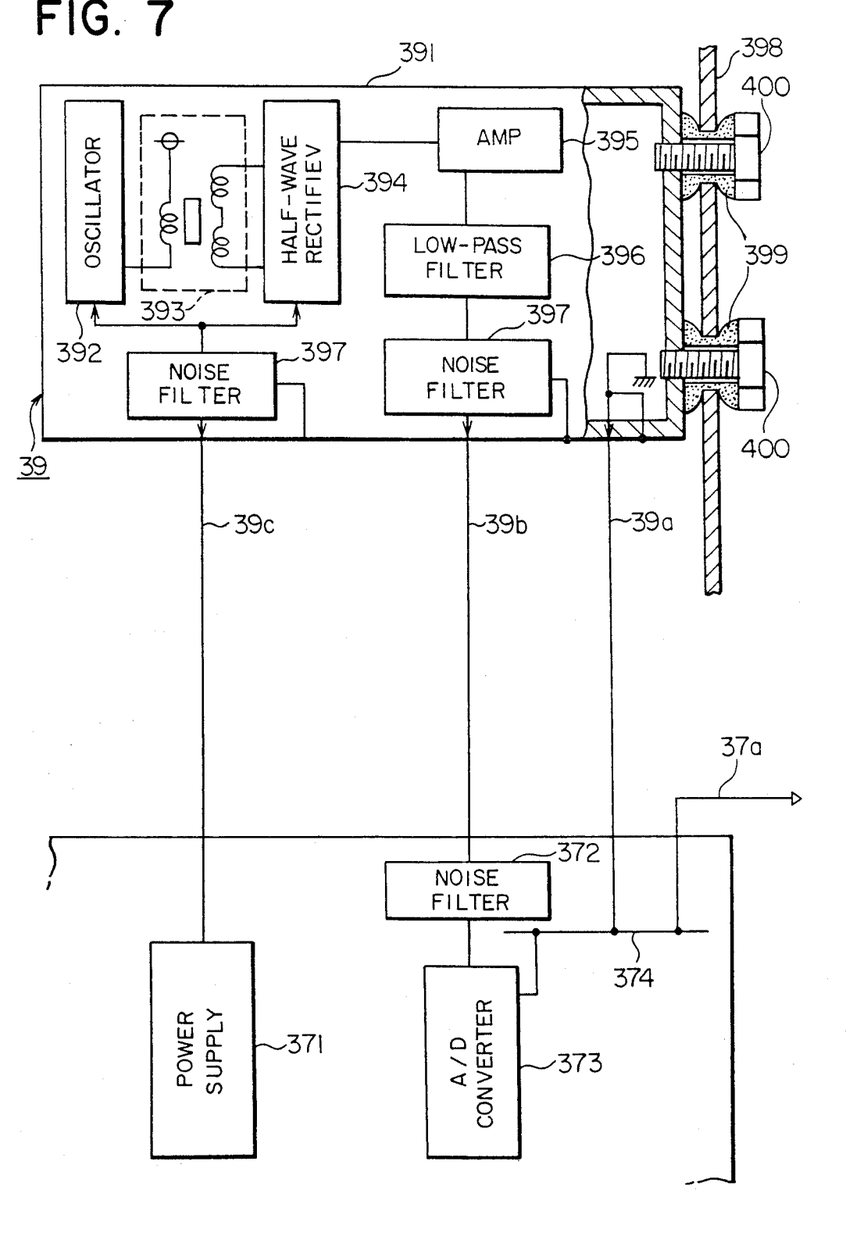
FIG. 7 is a block diagram of the inside of the G sensor of the embodiment of FIG. 1 and a cross-sectional view showing how the G sensor is mounted on the vehicle body.

FIG. 7 is a block diagram of the inside of the G sensor 39 of this embodiment and a cross-sectional view showing the manner of mounting the G sensor 39 on the vehicle. The G sensor 39 has an electrically-conducting housing 391 which is secured to the vehicle body 398 by mounting screws 400. The vehicle body 398 and the mounting screws 400 are insulated from one another by electrically-insulating bushings 399. Alternatively, the housing 391 can be secured to a special bracket which is secured to the vehicle body 398. The housing 391 contains an oscillator circuit 392 which provides an alternating current to a differential transformer-type displacement sensor 393. The differential transformer-type displacement sensor 393 detects the position of a core which displaces in proportion to the accelerations acting thereon, and it produces and output signal which passes through a half-wave rectifier 394, an amplifier circuit 395, and a low-pass filter 396 and becomes an output signal having a voltage which is proportional to the acceleration. The output signal from the low-pass filter 396 then passes through a noise filter 397, is transmitted through output lead 39b, and is input to the control unit 37, in which it passes through a noise filter 372 and is input to an A/D converter 373. A voltage-regulated power supply circuit 371 within the control unit 37 provides a power supply voltage to the inside of the control unit 37 and supplies current to the G sensor 39 through power supply lead 39c and a noise filter 397.

The noise filters 397, which can be through-type capacitor LC filters or the like, have excellent resistance to electromagnetic interference. The filter circuits share the same ground as the housing 391. The grounded portion of the housing 391 is connected to a ground circuit 374 within the control unit 37 by ground wire 39a.

The ground wire 39a is connected to the ground for the G sensor 39 in a location which is not influenced by the return current within the control unit 37 of the step motors 5a, the solenoid valves, or other actuators when the actuators are operated. Therefore, even if the potential of the ground circuit 374 of the control unit 37 varies due to the return current of the actuators which flows through the power supply ground 37a, the power supply voltage and the output voltage of the G sensor which are measured from the ground circuit 374 are totally unaffected.

Returning to FIG. 1, a steering sensor 40 which detects the rate of rotation of the steering wheel 41, i.e., the rate of steering is mounted on the steering wheel 41. It produces an output signal which is input to the control unit 37. A throttle opening sensor 42 which detects the angle of depression of an unillustrated accelerator pedal of the vehicle is provided. It produces an output signal which is input to the control unit 37. Compressor 11 is controlled by a compressor relay 43, which in turn is controlled by a control signal from the control unit 37. A pressure switch 44 which turns on when the pressure in the high-pressure chamber 15a falls below a prescribed level is mounted on the high-pressure chamber 15a. It produces an output signal which is input to the control unit 37. When the pressure within the high-pressure chamber 15a falls below a prescribed level, pressure switch 44 turns on, and compressor relay 43 is closed by the control unit 37. As a result, compressor 11 is driven, compressed air is sent to the high-pressure chamber 15a, and the pressure in the high-pressure chamber 15a is brought to above the prescribed level.

Figure 3A:
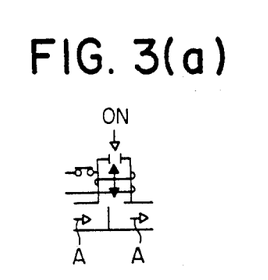
FIGS. 3(a) and 3(b) are schematic views respectively showing the on and off states of the three-way valves of the embodiment of FIG. 1.
Figure 3B:
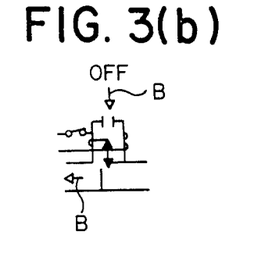

The opening and closing of solenoid valves 19, 20, 22, 23, 24, 26, 27, 28, 30, and 31 is controlled by control signals from the control unit 37. Solenoid valves 22, 23, 26, and 27 are three-way valves, and the two states thereof are illustrated in FIG. 3. FIG. 3(a) shows the state of each of the three-way valves when energized. In this state, compressed air moves along the pathway shown by the arrows marked A. On the other hand, FIG. 3(b) shows the state in which the three-way valves are off, and in this state, compressed air moves along the pathway shown by the arrows marked B.

Figure 4A:
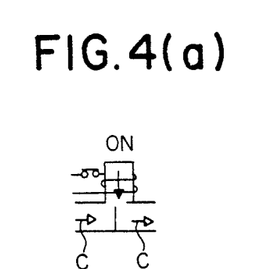
FIGS. 4(a) and 4(b) are schematic views respectively showing the on and off states of the two-way valves of the embodiment of FIG. 1.

Solenoid valves 20, 24, and 30 are two-way valves. Their two operating states are shown in FIG. 4. FIG. 4(a) shows the state in which one of the two-way solenoid valves is energized. In this state, compressed air moves in the direction shown by the arrows marked C.

Figure 4B:
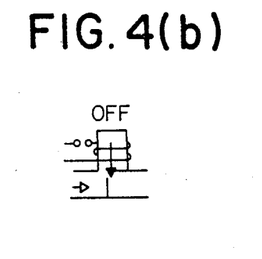

FIG. 4(b) shows the state in which the solenoid valve is off. In this state, there is no flow of compressed air.

Figure 5:
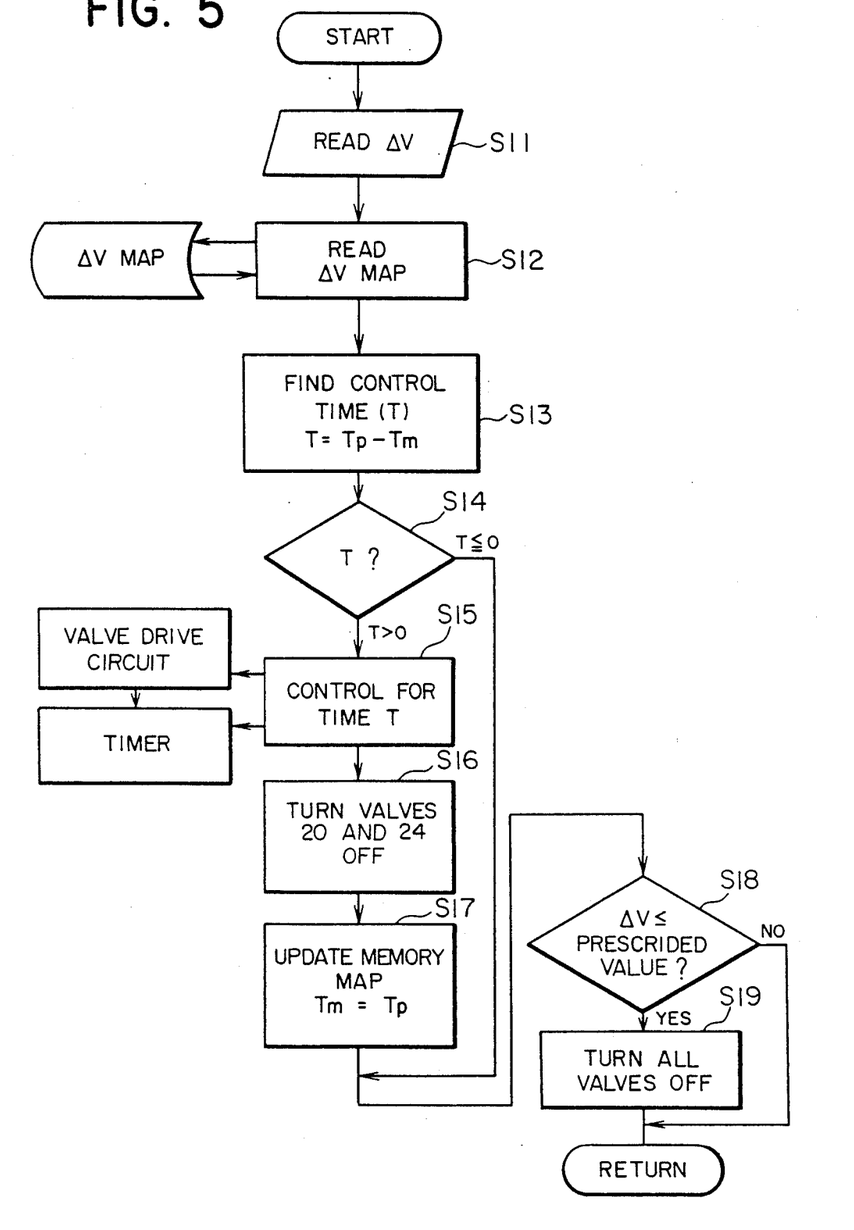
FIG. 5 is a flow chart showing the operation of the control unit of the embodiment of FIG. 1 when performing roll suppression.
Figure 6:
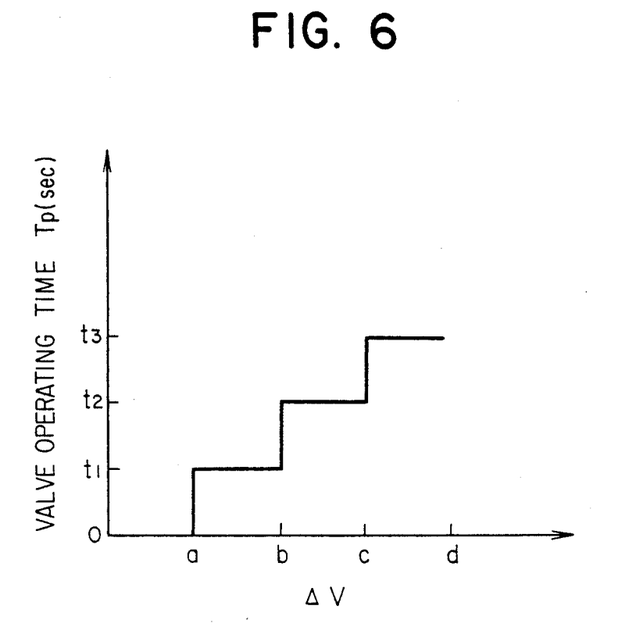
FIG. 6 is a graph of the relationship between the variation $\Delta V$ of the output of the G sensor of the embodiment of FIG. 1 from a neutral value and the valve operating time Tp.

Next, roll suppression by the embodiment of a suspension control apparatus illustrated in FIG. 1 will be described while referring to FIG. 5, which is a flow chart of the control operations performed by the control unit 37 during a right turn. First, in Step S11, the voltage V of the output signal from the G sensor 39 is read by the control unit 37, and the deviation $_\Delta V$ (=V−2.5 volts) from the neutral value of V corresponding to no acceleration is computed. The control unit 37 then proceeds to Step S12, in which a $_\Delta V$ map like that shown in FIG. 6 which is stored in the control unit 37 is referred to and the valve operating time Tp is determined. Next, in Step S13, the control time T=Tp−Tm is computed. The value of Tm is stored in a map in memory and indicates the length of time for which the valves have already been operated. Accordingly, when Step S13 is performed for the first time, Tm=0, so T is set equal to Tp. Then, Step S14 is performed, and it is determined whether T is greater than 0. In Step S14, if it is determined that T>0, then in Step S15, valve control is performed for control time T. The following table shows which valves are opened for each mode of control.

For example, during a right turn during which $_\Delta V>0$, the right side of the vehicle body attempts to rise, and the left side attempts to fall. In order to suppress this rolling motion, the valves marked with a o for a right turn in the above table are operated for control time T only. As a result, compressed air from the high-pressure chamber 15a is supplied to the main air spring chambers 7 of the front and rear left suspension units FS1 and RS1 through the air supply flow control valve 19, front and rear air supply valves 20 and 24, and solenoid valves 23 and 27, and the left side of the vehicle body is prevented from falling. On the other hand, the compressed air in the main air spring chambers 7 of the front and rear right suspension units FS2 and RS2 is discharged through the front and rear right solenoid valves 22 and 26 and the front and rear air discharge valves 28 and 31 to the low-pressure chamber 15b. As a result, the right side of the vehicle body is prevented from rising. In the above manner, the tendency of the right side of the vehicle body to rise and of the left side to fall during a right turn is suppressed. When control of the valves for control time T is completed, the control unit 37 turns off the front air supply valve 20 and the rear air supply valve 24 in Step S16, and the supply of

TABLE

| | | | | Front Air Supply Valve (20) | Rear Air Supply Valve (24) | Front Air Discharge Valve (28) | Rear Air Discharge Valve (31) | Air Supply Flow Control Valve (19) | Air Discharge Solenoid Valve (30) |
|---|---|---|---|---|---|---|---|---|---|
| (1) Roll Control | | Right Turn | Start | o | o | x | x | x | x |
| | | | Maintain | x | x | o | o | x | x |
| | | | Release | x | x | x | x | x | x |
| | | Left Turn | Start | o | o | x | x | x | x |
| | | | Maintain | x | x | o | o | x | x |
| | | | Release | x | x | x | x | x | x |
| (2) Nose-Dive Control | | | Start | o | x | x | x | x | x |
| | | | Maintain | x | x | x | x | x | x |
| | | | Restore | x | o | x | x | x | x |
| (3) Squat Control | | | Start | x | o | x | x | x | x |
| | | | Maintain | x | x | x | x | x | x |
| | | | Restore | o | x | x | x | x | x |
| (4) Vehicle Height Control (Normal) | | | Raise | o | o | x | x | o | x |
| | | | Lower | x | x | o | o | x | o |
| (5) Rapid Vehicle Height Control | | | Raise | o | o | x | x | x | x |
| (6) Left-Right Connection Closing | | | Maintain | x | x | o | o | x | x |

| | | | | Front Right Solenoid Valve (22) | Front Left Solenoid Valve (23) | Rear Right Solenoid Valve (26) | Rear Left Solenoid Valve (27) |
|---|---|---|---|---|---|---|---|
| (1) Roll Control | | Right Turn | Start | o | x | o | x |
| | | | Maintain | o | x | o | x |
| | | | Release | x | x | x | x |
| | | Left Turn | Start | x | o | x | o |
| | | | Maintain | x | o | x | o |
| | | | Release | x | x | x | x |
| (2) Nose-Dive Control | | | Start | x | x | o | o |
| | | | Maintain | x | x | x | x |
| | | | Restore | o | o | x | x |
| (3) Squat Control | | | Start | x | x | x | x |
| | | | Maintain | x | x | x | x |
| | | | Restore | x | x | o | o |
| (4) Vehicle Height Control (Normal) | | | Raise | x | x | x | x |
| | | | Lower | o | o | o | o |
| (5) Rapid Vehicle Height Control | | | Raise | x | x | x | x |
| (6) Left-Right Connection Closing | | | Maintain | o | x | o | x | compressed air to the main air spring chambers 7 is stopped.

At the same time, in Step S16, the front and rear air discharge valves 28 and 31 are turned on, and the discharge of air from the main air spring chambers 7 is stopped. As a result, the previously-controlled attitude is maintained. Next, in Step S17, the map in memory is updated. Namely, the time Tp for which the valves were operated is stored as Tm (Tm=Tp). Then, in Step S18, it is determined whether $_\Delta V$ is below a prescribed value. For example, during turning, when $_\Delta V$ is larger than a prescribed value, Step S19, in which attitude control would be terminated, is skipped and Step S11 is returned to. On the other hand, if in Step S18 it is determined that $_\Delta V$ is smaller than the prescribed value, all the valves are turned off, and the attitude control which was maintained in Step S16 is terminated. Thereafter, Step S11 is returned to, and in Step S12, Tp is found.

In the above-described embodiment, the case was explained in which roll suppression is performed based only on the value of $_\Delta V$. However, it is possible to perform the above-described roll suppression by computing Tp from a special map based on the direction of $_\Delta V$, the vehicle speed which is detected by the vehicle speed sensor 38, and the steering angular speed which is detected by the steering sensor 40. This computing step corresponds to Step S12 in the flow chart. In this case as well, the determination of whether to restore control is performed in the same manner as in Step S18.

In addition, in the above-described embodiment, $_\Delta V$ is computed by subtracting 2.5 V, which corresponds to no acceleration, from the output V of the G sensor 39.

Although not mentioned with respect to the above-described embodiment, the step motors 5a for changing the damping force of the shock absorbers 1 are operated in conjunction with the start and finish of the above-described control.

As mentioned above, all the actuators such as the step motors 5a and the valves are controlled in accordance with the state of the vehicle. The drive currents for the actuators flow through the drive circuit of the control unit 37 to the power supply ground 37a. The drive currents which flow through the power supply ground 37a greatly vary in accordance with the state of control. Therefore, the magnitude of the drop in the voltage of the power supply ground 37a varies, and the potential of the ground circuit 374 of the control unit 37 varies accordingly. However, since the ground of the G sensor 39 is connected to the ground circuit 374 of the control unit 37 via the ground wire 39a, the ground potential of the G sensor 39 is maintained the same as the potential of the ground circuit 374 of the control unit 37. Therefore, even if the potential of the ground circuit 374 within the control unit 37 varies due to the drive currents for the actuators, the output of the G sensor 39 undergoes A/D conversion without error, it is input to the control unit 37, and the value of $_\Delta V$ is not influenced by the drive current for the actuators. Therefore, stable attitude control can be performed.

In accordance with this embodiment, the reference voltage for the G sensor 39 is supplied by the control unit 37, so there is no error which is caused by a voltage difference when there are two respective supply voltages. In addition, the detecting portion of the G sensor 39 can be decreased in size, and the amount of heat which it generates can be decreased.

The electrically-conducting housing 391 of the G sensor 39 is at the same potential as the ground for the electrical components of the G sensor 39, and it is used as the ground for the noise filters 397 of the G sensor 39. Therefore, the resistance to electromagnetic interference of the components of the G sensor 39 is not impaired. Moreover, as the housing 391 of the G sensor 39 is screwed to the vehicle body 398 through electrically-insulating bushings 399, the ground potential of the G sensor 39 corresponds to the ground potential of the control unit 37, and there is no impairment of the function of the G sensor 39.

The illustrated embodiment was described for the case in which it performs roll suppression. However, by suitably disposing a G sensor 39 so as to detect longitudinal or vertical accelerations, the present invention can be used to suppress pitching (nose-diving and squatting) or heaving by controlling the valves in the manner indicated in the table. Furthermore, the ground circuit structure of the present embodiment can also be applied to analog sensors besides a G sensor 39, such as a roll angle sensor, a load sensor, a gas pressure sensor, or a vehicle height sensor.

What is claimed is:

1. A suspension control apparatus for an automotive vehicle comprising:
    a plurality of suspension units which are disposed between each of the wheels of a vehicle and a body of the vehicle and which each support the vehicle body with respect to a corresponding wheel;
    a plurality of actuators for controlling the characteristics of said suspension units;
    acceleration detecting means for detecting the acceleration of the vehicle and producing a corresponding output signal, said acceleration detecting means being supported by and electrically insulated from the vehicle body, said acceleration detecting means having a ground circuit, said acceleration detecting means comprising an electrically conducting housing and an electrically insulating member through which said housing is secured to said body of the vehicle, said ground circuit being grounded on said housing;
    control means for calculating changes in the attitude of the vehicle based on at least the output signal of said acceleration detecting means, and based on the calculated attitude changes, controlling said actuators so as to suppress changes in attitude of the vehicle body, said control means having a ground circuit; and
    a ground wire separate from a chassis of said vehicle which connects the ground circuit of said control means directly with the ground circuit of said acceleration detecting means so that the two ground circuits are at the same potential independently of any deviation of a potential of said ground circuit of said control means from a power supply ground potential of said vehicle.

2. A suspension control apparatus for a vehicle as claimed in claim 1, wherein said control means includes a voltage-regulated power supply which is connected to said acceleration detecting means and functions as a power supply therefor.

* * * * *